United States Patent
Braden

[11] Patent Number: 5,878,524
[45] Date of Patent: Mar. 9, 1999

[54] FISHING LURE WITH RETRACTABLE HOOKS

[76] Inventor: Daniel L. Braden, P.O. Box 145-0145, Marshall, Mich. 49068

[21] Appl. No.: 626,510

[22] Filed: Apr. 2, 1996

[51] Int. Cl.[6] .......................... A01K 83/02; A01K 83/00
[52] U.S. Cl. .................................................. 43/35; 43/37
[58] Field of Search ................... 43/34, 35, 36, 43/37

[56] References Cited

U.S. PATENT DOCUMENTS

| | | |
|---|---|---|
| 1,009,538 | 11/1911 | Lowe . |
| 1,021,699 | 3/1912 | Nordlund . |
| 1,204,538 | 11/1916 | Belding . |
| 1,318,073 | 10/1919 | Gottschalk ............................. 43/35 |
| 1,355,858 | 10/1920 | Smith . |
| 1,430,642 | 10/1922 | Gross . |
| 1,556,297 | 10/1925 | Moore . |
| 1,557,644 | 10/1925 | Andersen . |
| 1,609,151 | 11/1926 | Bruenig ................................. 43/37 |
| 1,609,160 | 11/1926 | Deckman ............................... 43/36 |
| 1,639,766 | 8/1927 | Fisher .................................... 43/37 |
| 1,670,174 | 5/1928 | Wiersma . |
| 1,971,083 | 2/1934 | Pike ....................................... 43/37 |
| 2,009,298 | 7/1935 | Nelson ................................... 43/34 |
| 2,041,634 | 5/1936 | Boyko ................................... 43/36 |
| 2,244,980 | 6/1941 | Abramson .............................. 43/37 |
| 2,256,088 | 9/1941 | Hogan .................................... 43/36 |
| 2,295,042 | 9/1942 | Llewellyn .............................. 43/36 |
| 2,439,391 | 4/1948 | Jobson ................................... 43/37 |
| 2,456,665 | 12/1948 | Adams ................................... 43/37 |
| 2,459,819 | 1/1949 | Hoage .................................... 43/39 |
| 2,463,978 | 3/1949 | Kunzelman ............................ 43/35 |
| 2,470,861 | 5/1949 | Prentice ................................. 43/35 |
| 2,505,051 | 4/1950 | Kridler ................................... 43/35 |
| 2,505,052 | 4/1950 | Kridler ................................... 43/35 |
| 2,521,555 | 9/1950 | Widmer ................................. 43/35 |
| 2,544,782 | 3/1951 | Fawcett ................................. 43/36 |
| 2,546,614 | 3/1951 | Prentice ................................. 43/37 |
| 2,552,113 | 5/1951 | Prentice ................................. 43/35 |
| 2,572,817 | 10/1951 | Reed ...................................... 43/35 |
| 2,576,532 | 11/1951 | Nudell ................................... 43/37 |
| 2,619,756 | 12/1952 | Hunicke et al. ....................... 43/35 |
| 2,641,861 | 6/1953 | Doran .................................... 43/37 |
| 2,700,842 | 2/1955 | Lehmann ............................... 43/35 |
| 2,729,013 | 1/1956 | Chandler ............................... 43/35 |
| 2,748,520 | 6/1956 | Anderson .............................. 43/35 |
| 2,854,778 | 10/1958 | Polki ..................................... 43/35 |
| 2,896,355 | 7/1959 | Dean et al. ............................ 43/35 |
| 2,906,051 | 9/1959 | O'Bryan ................................ 43/35 |
| 2,968,113 | 1/1961 | Multanen .......................... 43/42.06 |
| 3,060,619 | 10/1962 | Cornick ................................. 43/35 |
| 3,086,313 | 4/1963 | Dinehart ................................ 43/37 |
| 3,218,749 | 11/1965 | Dow ...................................... 43/35 |
| 3,410,019 | 11/1968 | Landi .................................... 43/35 |
| 3,418,743 | 12/1968 | Halvorsen ............................. 43/35 |
| 3,492,753 | 2/1970 | Richard ................................. 43/35 |
| 3,497,985 | 3/1970 | Margulies ............................. 43/35 |

(List continued on next page.)

FOREIGN PATENT DOCUMENTS 1139688  11/1962  Germany .

Primary Examiner—Kurt Rowan
Attorney, Agent, or Firm—Flynn, Thiel, Boutell & Tanis, P.C.

[57] ABSTRACT

A fishing lure wherein a hook is retracted within the body of the lure during casting and retrieving and is released and extended to an extended hooking position in response to the strike of a fish. The lure including a plunger slidably received within a plunger cavity which extends through the lure body, and a nose assembly, which inserts into the housing so as to receive the plunger between two diametrically opposed resilient fingers. The resilient fingers having inwardly extending projections which seat within corresponding notches in the plunger so as to lock the plunger and the attached hook in the retracted position and release the plunger upon forward movement of the nose assembly relative to the housing. The fingers being disposed in a locking chamber when the plunger is in the retracted position so that a wall of the locking chamber prevents the fingers from releasing the plunger until the fingers are moved out of the locking chamber by the displacement of the nose assembly.

20 Claims, 8 Drawing Sheets

U.S. PATENT DOCUMENTS

| | | | |
|---|---|---|---|
| 3,574,265 | 4/1971 | Gibbons | 43/35 |
| 3,631,624 | 1/1972 | Edde | 43/35 |
| 3,646,699 | 3/1972 | Zeman | 43/35 |
| 3,665,634 | 5/1972 | Baud | 43/35 |
| 3,739,517 | 6/1973 | Schleif | 43/35 |
| 3,765,118 | 10/1973 | Reitler | 43/43.12 |
| 3,786,587 | 1/1974 | Niileksela | 43/35 |
| 3,791,064 | 2/1974 | Van Iseghem, Jr. | 43/26.2 |
| 3,802,114 | 4/1974 | Diebold | 43/37 |
| 3,816,953 | 6/1974 | Hameen-Anttila | 43/35 |
| 3,818,626 | 6/1974 | Peippo | 43/42.04 |
| 4,024,668 | 5/1977 | McDiarmid et al. | 43/35 |
| 4,031,652 | 6/1977 | Johnson | 43/43.12 |
| 4,166,334 | 9/1979 | Talalaj | 43/35 |
| 4,274,220 | 6/1981 | Rogers, Jr. | 43/35 |
| 4,760,665 | 8/1988 | Stueder | 43/36 |
| 4,765,084 | 8/1988 | Braden | 43/34 |
| 4,782,618 | 11/1988 | Rainey | 43/35 |
| 4,827,656 | 5/1989 | Ohnishi | 43/34 |
| 4,905,401 | 3/1990 | Fukumoto | 43/43.12 |
| 5,491,925 | 2/1996 | Carpenter | 43/35 |

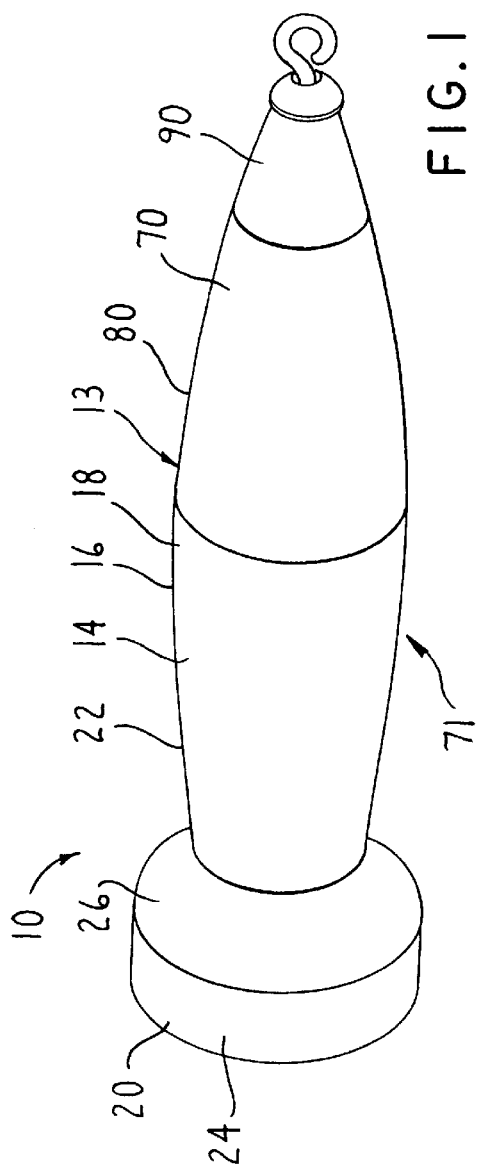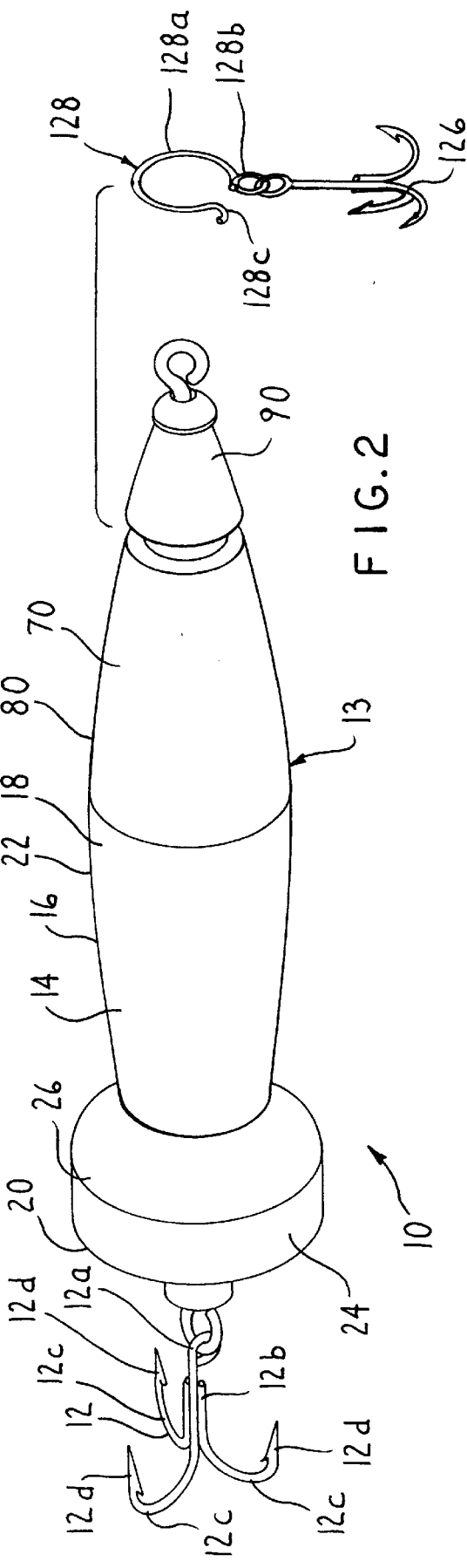

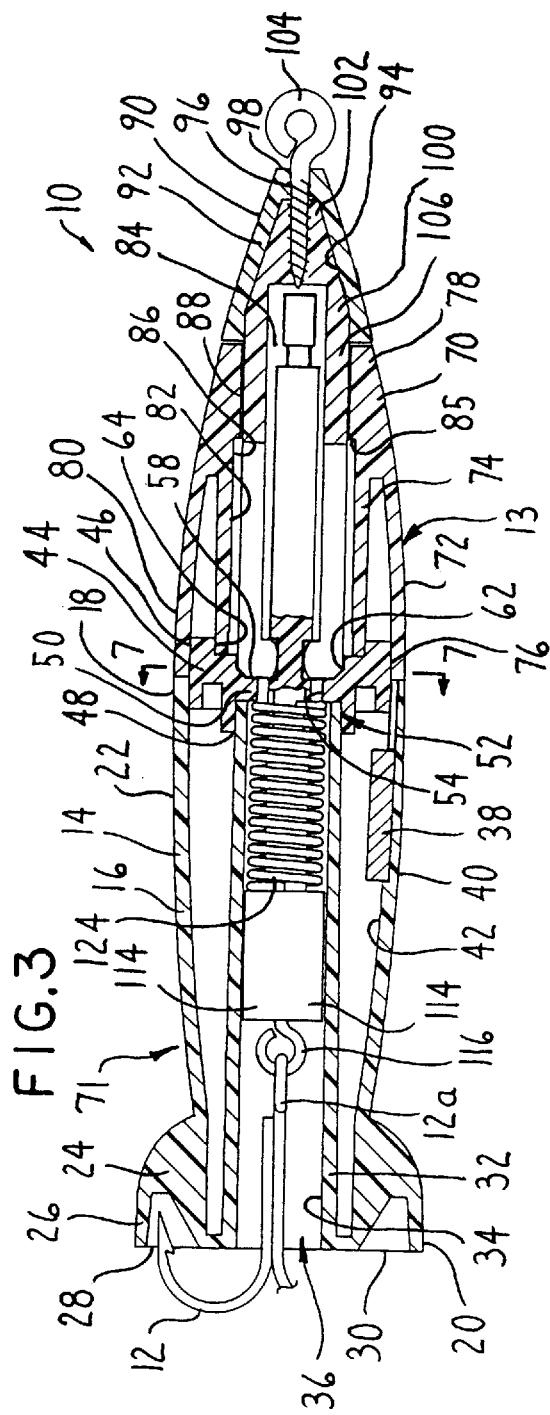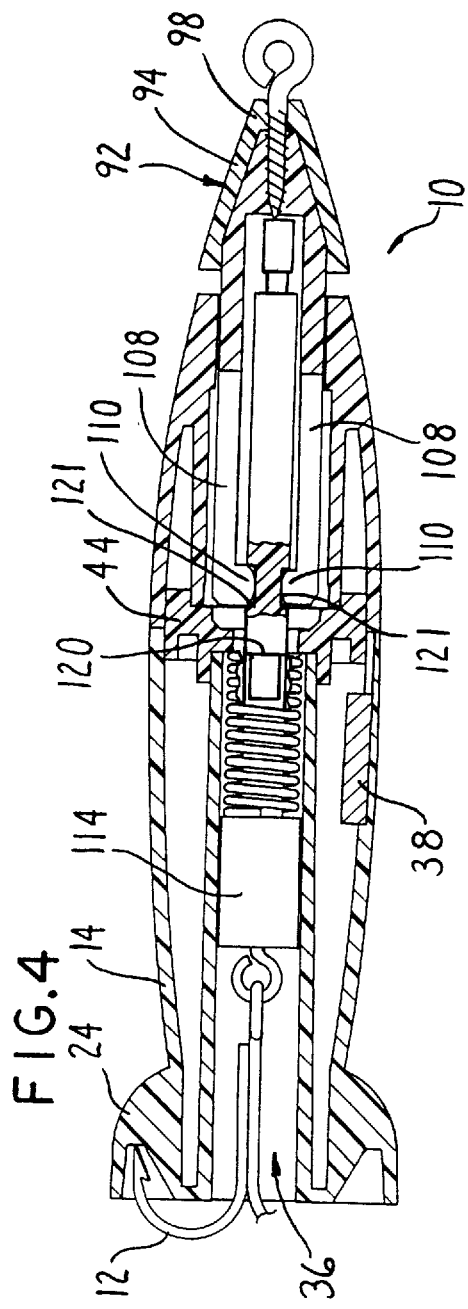

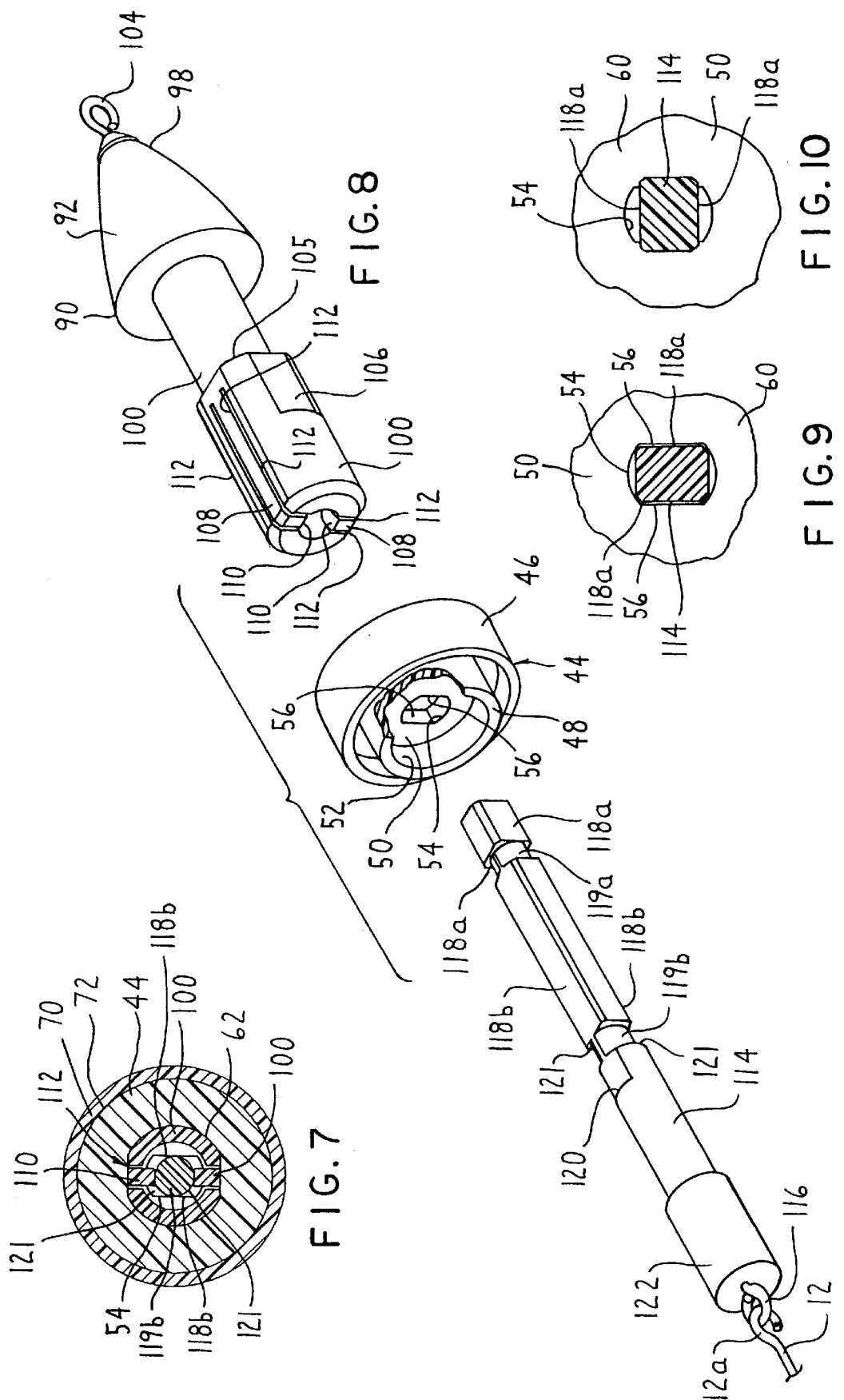

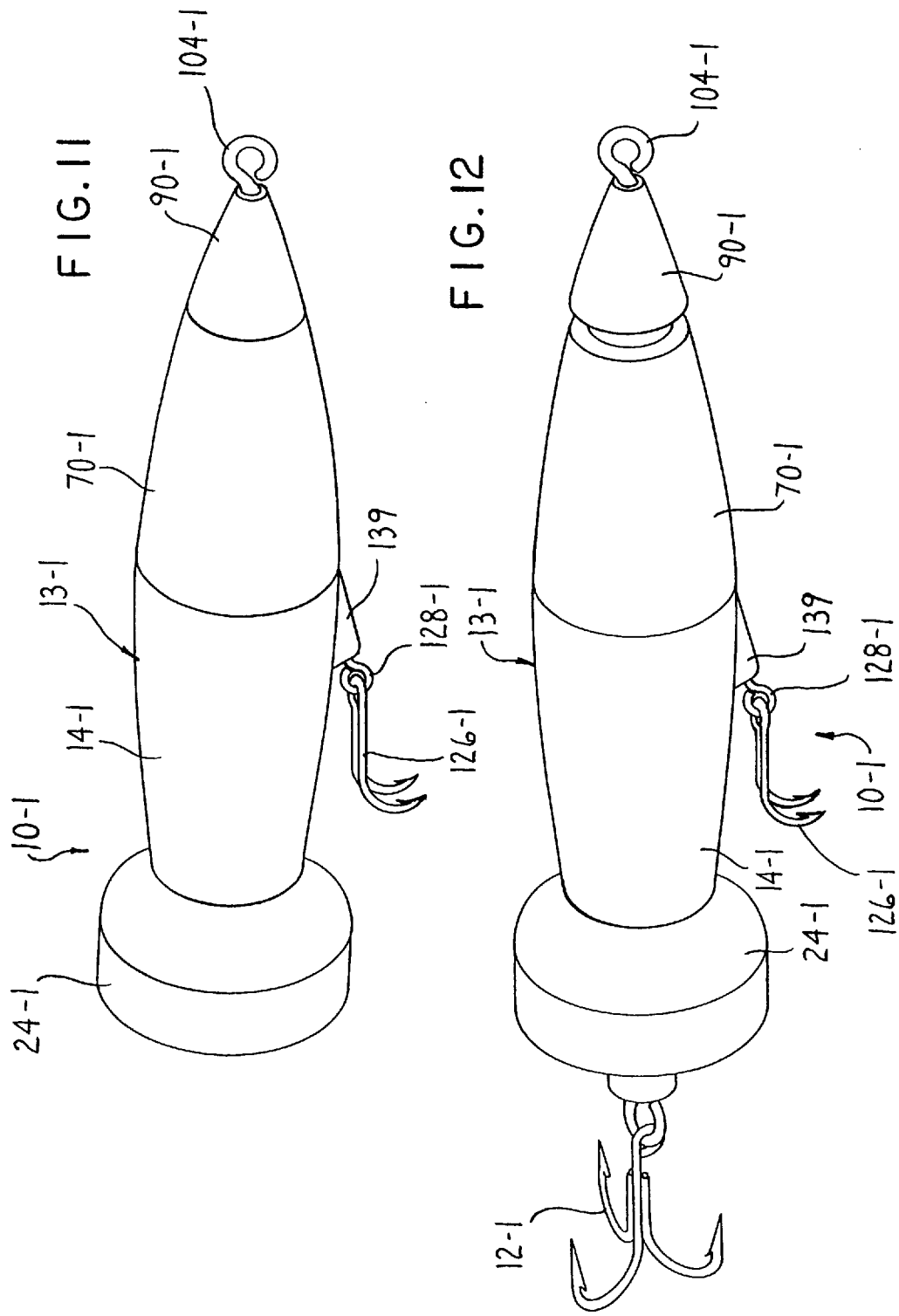

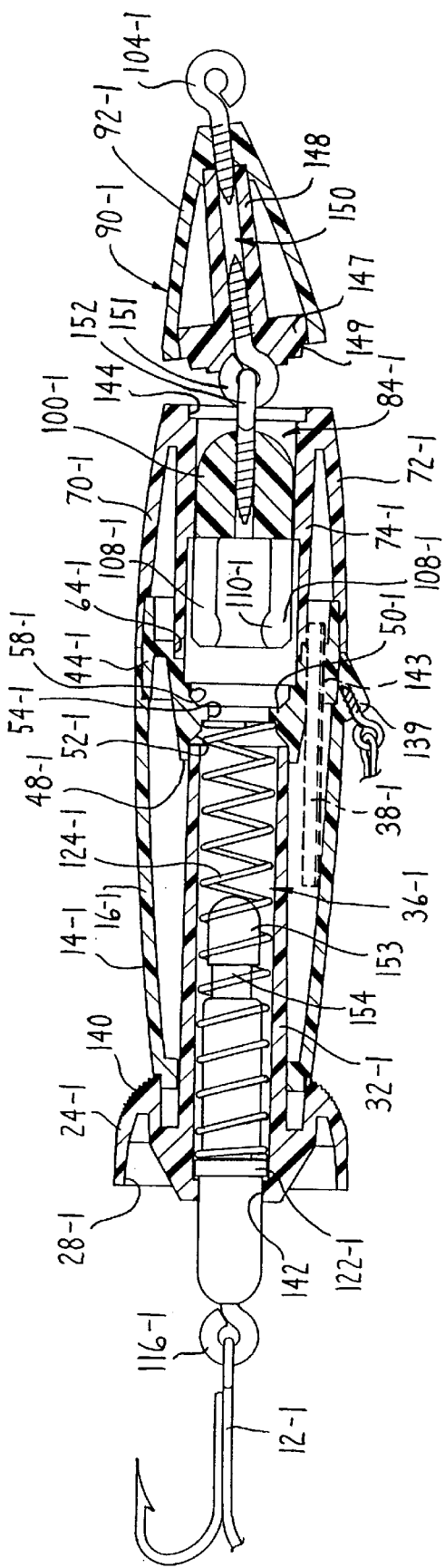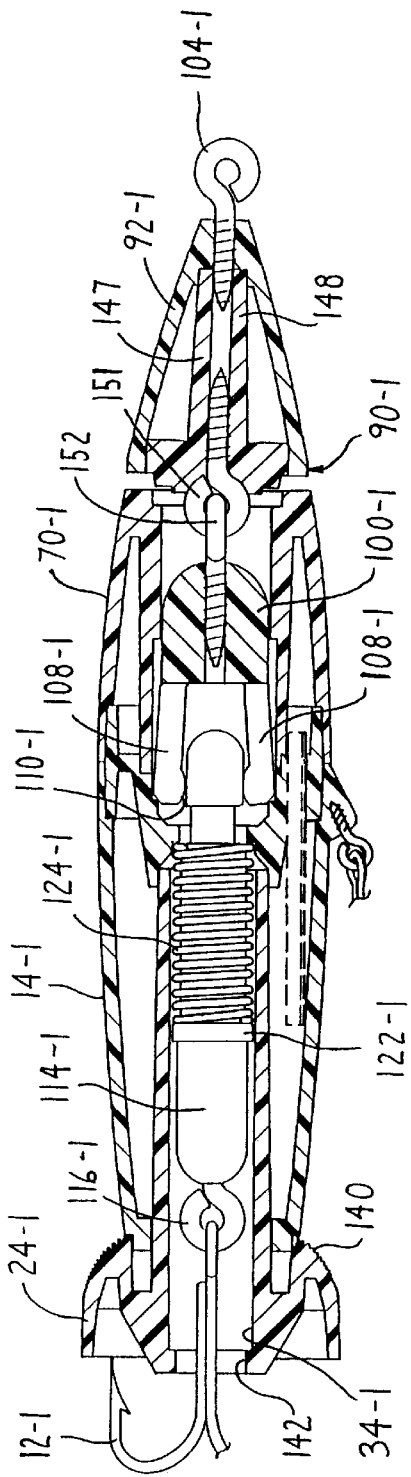

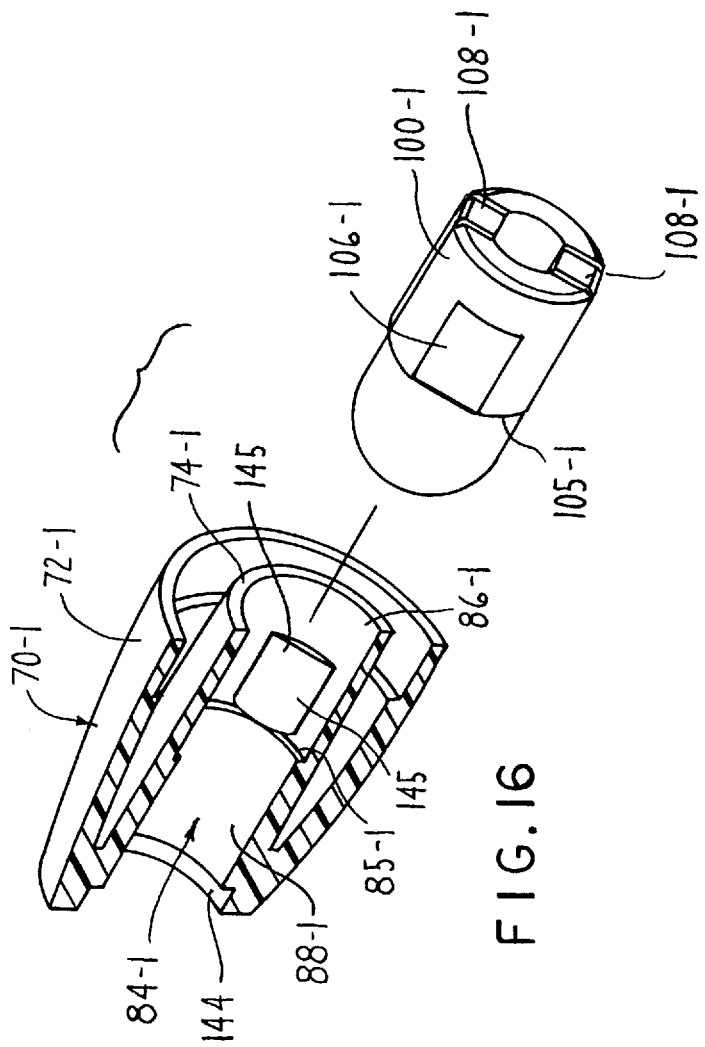

FISHING LURE WITH RETRACTABLE HOOKS

FIELD OF THE INVENTION

The invention generally relates to a fishing lure with a retractable hook, which is commonly referred to as a "weedless" lure, and more particularly to a fishing lure wherein the hook is retracted within the body of the lure during casting and retrieving and the hook is released and extends to an extended hooking position in response to the strike of a fish.

BACKGROUND OF THE INVENTION

Anglers appreciate that the likelihood of success when fishing can be increased by fishing areas which provide cover for fish and in particular, appreciate that the likelihood of success is increased by fishing such areas of cover as beds of weeds and grass or underwater brush. These areas, however, can be difficult to fish with conventional lures having exposed hooks, typically treble hooks, since the hooks are prone to snagging of weeds, grass, branches or the like which may require cleaning snagged material from the hooks after each cast or if the lure has become snagged upon a fixed structure, the lure may even be lost.

To facilitate fishing in such areas, various lures have been developed which enclose the hook within the lure when casting and retrieving to prevent the occurrence of undesirable snags. Such lures are commonly referred to as "weedless" fishing lures which lures thereby expose the hook upon the strike of a fish.

For example, U.S. Pat. No. 2,896,355 discloses a "weedless" lure having a slidable shaft to which deformable hooks are secured. The shaft is forwardly slidable within the body of the lure which causes deformation of the hooks as they are retracted into the lure body. The shaft thereafter is restrained in position by two elongated strips oriented transverse to the slidable shaft and disposed on opposite sides thereof so as to seat within corresponding notches on the shaft and prevent movement of the slidable shaft. To spread the elongated strips apart and release the shaft, a mechanism is disposed sidewardly from the shaft which mechanism includes a cone-shaped wedge which moves between the strips to bias the strips apart upon an increase in tension in the fishing line.

Such an arrangement, however, uses a separate mechanism for spreading the strips which mechanism is disposed sidewardly of the shaft. In addition, the mechanism includes a short length of line extending between the main fishing line and the actuating mechanism to pull the wedge between the strips which length of line is exposed outside the body of the lure and may be prone to snagging. Still further, this lure also requires flexibility within the hooks to permit their retraction into the body of the lure which flexibility is an undesirable feature in a fish hook.

It is desirable, therefore, to provide a "weedless" fishing lure wherein the locking mechanism for holding the hook in a retracted position has a limited number of component parts which are contained entirely within the body of the lure. It is further desirable that the locking mechanism lock the hook in a retracted position while at the same time being itself positively restrained in the locking condition. Preferably, both the hook and the locking mechanism are released in response to an increase in tension in the fishing line. Still further, it is desirable that such a "weedless" fishing lure use conventional hooks, typically treble hooks, having a relatively high rigidity to facilitate embedding of the hook within the mouth of a potentially trophy size fish being caught thereby.

SUMMARY OF THE INVENTION

The invention relates to a "weedless" fishing lure for attachment to a fishing line which has a plunger slidably received within the lure body so that a hook at the rear end of the plunger is movable from an extended position to a retracted position within the lure body. The lure body comprises a housing having a plunger cavity extending therethrough in which the plunger slides and a nose assembly, which is inserted into the housing through an open forward end and receives the plunger between two diametrically opposed resilient fingers thereof.

The resilient fingers include radially inwardly extending bulbous projections and flex so that the bulbous projection moves radially inwards into a locking position within detents in the plunger to restrain the plunger in the retracted position and is movable radially outwardly to a release position to release the plunger upon forward displacement of the nose assembly relative to the plunger. Upon release of the plunger by the bulbous projection, the plunger is free to move rearwardly to the extended position. This is accomplished by a spring disposed about the plunger which biases the plunger rearwardly.

The locking member further includes a locking chamber. When the bulbous projections are seated within the detents of the plunger, the resilient fingers are moved rearwardly into the locking chamber so that the chamber walls prevent radial outward movement of the bulbous projections out of the detents. Until the nose assembly pulls the resilient fingers out of the locking chamber, the resilient fingers are prevented from releasing the detents. With the aforesaid arrangement, the objects and purposes of the invention are achieved.

BRIEF DESCRIPTION OF THE DRAWINGS

FIG. 1 is a pictorial view illustrating a fishing lure of the invention in a retracted condition;

FIG. 2 is a pictorial view illustrating the fishing lure of FIG. 1 in an extended condition with a retractable hook extended out of the lure and an optional removable hook that removably attaches to the lure;

FIG. 3 is a side elevational view in cross section illustrating the fishing lure of FIG. 1 as viewed in a sideward direction;

FIG. 4 is a side elevational view in cross section illustrating the fishing lure of FIG. 3 with a nose assembly in an extended release position;

FIG. 7 is a front elevational view in cross section illustrating the fishing lure as viewed in the direction of reference arrows 7—7 of FIG. 3;

FIG. 8 is an exploded perspective view illustrating a retractable plunger, a locking member and the nose assembly;

FIG. 9 is an enlarged partial cross sectional view illustrating a forward end of the retractable plunger while being inserted through the locking member;

FIG. 10 is an enlarged partial cross sectional view illustrating the forward end of the retractable plunger which has been rotated to a locking position after insertion through the locking member;

FIG. 11 is a pictorial view illustrating a preferred embodiment of the fishing lure of the invention in a retracted condition;

FIG. 12 is a pictorial view illustrating the preferred fishing lure of FIG. 11 in an extended condition;

FIG. 13 is a side elevational view in cross section illustrating the preferred fishing lure in the extended condition;

FIG. 14 is a side elevational view in cross section illustrating the preferred fishing lure with the retractable hook disposed in a position intermediate a retracted position and a fully extended position;

FIG. 16 is an exploded partial perspective view in cross section illustrating a front housing and an engagement member of the nose assembly.

DETAILED DESCRIPTION

Figure 5:
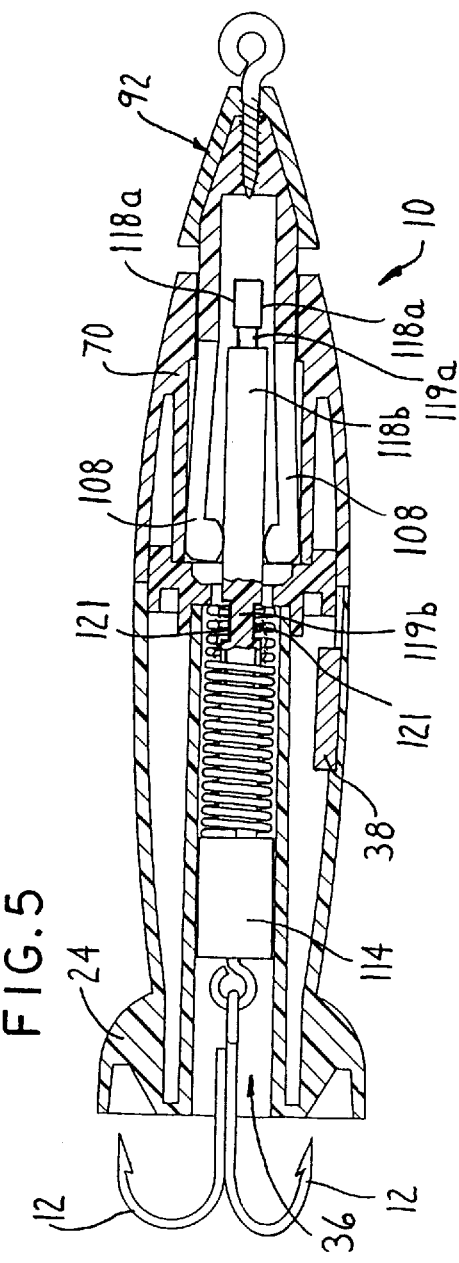
FIG. 5 is a side elevational view in cross section illustrating the fishing lure with the retractable hook disposed in a position intermediate a retracted position and a fully extended position.

Referring to FIGS. 1 and 2, the fishing lure 10 of one embodiment of the invention is actuatable between a retracted condition (FIG. 1) and an extended condition (FIG. 2). Typically during casting and retrieving of the fishing lure 10, the fishing lure 10 is in the retracted condition (FIG. 1) so as to avoid undesirable snagging of underwater structures and vegetation. Upon the strike of a fish, however, the fishing lure 10 actuates to the extended condition (FIG. 2) whereby a hook or hook member 12 is released from the interior of the fishing lure 10 to permit embedding of the hook 12 in the mouth of the fish. More particularly, the hook 12 preferably is a treble hook of conventional construction. The hook 12 includes an eyelet 12a, a shank 12b and three arcuate portions 12c which each terminate at forwardly directed barbed points 12d.

The fishing lure 10 has an elongate lure body 13, which includes a tail housing 14 as can be seen in FIGS. 1 and 3. The tail housing 14 includes an exterior wall 16 which extends from a forward end 18 to a rearward end 20 of the tail housing 14 and defines a circumferential exterior surface 22 thereof. Preferably, the tail housing 14 tapers rearwardly inwardly so as to mimic the general appearance of a fish.

Proximate the rearward end 20, the tail housing 14 includes an increased diameter mouth portion 24, the exterior surface 26 of which defines a generally parabolic cross sectional shape. The mouth portion 24 includes a rearwardly opening hook-receiving annular chamber 28. The annular chamber 28 has an annular opening 30 and a generally V-shaped cross sectional profile to accommodate the barbed points 12d of the hook 12.

Radially inwards of the exterior wall 16 and the mouth portion 24, the tail housing 14 includes an interior wall 32 which is substantially tubular and extends longitudinally between the forward and rearward ends 18 and 20. The interior wall 32 has one end formed integral with the mouth portion 24 and has the other opposite end cantilevered forwardly from the mouth portion 24. A curved interior surface 34 of the interior wall 32 defines a plunger cavity 36 which opens both forwardly and rearwardly from the respective forward and rearward ends 18 and 20 of the tail housing 14.

Preferably, the tail housing 14 is molded from a suitable plastic such as a polycarbonate acrylic. It should, be appreciated that any other suitable material may be used.

Preferably, the fishing lure 10 also includes an internal counterweight 38 which is formed of a relatively high density material, such as steel, and is secured in this embodiment within a recess 40 formed within a radially inward facing surface 42 of the exterior wall 16. By making the lure 10 heavier on one side thereof, the counterweight 38 serves to impede undesirable rotation of the fishing lure 10 during retrieving and thus cause the fishing lure 10 to maintain a generally even orientation during retrieval. While the counterweight 38 is fixed to the inward facing surface 42, the counterweight 38 also could be secured at other locations in the lure 10. For example, the counterweight 38 could be hingedly secured to the exterior of the lure 10 to provide a fin-like effect.

At the forward end 18 of the tail housing 14, the fishing lure 10 also includes a cylindrical locking member or section 44 as illustrated in FIGS. 3 and 8 which is formed of molded plastic and has a substantially circular cross sectional shape, the outer circumference of which is defined by an outward facing surface 46. The diameter of the locking member 44 is proximate the diameter of the inward facing surface 42 of the exterior wall 16 so that the locking member 44 can be seated within the open forward end 18 of the tail housing 14. The locking member 44 is secured in this opening by any suitable adhesive or fastener (not illustrated) or by sonic welding so long as the locking member 44 remains fixed within the tail housing 14 during use of the fishing lure 10.

The locking member 44 is formed so as to have a rearwardly projecting annular wall 48 and a dividing wall 50 that define a rearward opening seat 52. The seat 52 is dimensioned to receive the cantilevered forward end of the interior wall 32 of the tail housing 14 therein when the locking member 44 is inserted within the open forward end 18 of the tail housing 14.

The dividing wall or "bulkhead" 50 includes a central non-circular or "keyed" aperture 54 extending therethrough as can be seen in FIGS. 8 and 9. The non-circular aperture 54 is positioned so as to communicate with the plunger cavity 36 when the locking member 44 is seated within the tail housing 14. The non-circular aperture 54 preferably includes two flats 56 (FIG. 9) which are diametrically opposite one with respect to the other.

Forwardly of the dividing wall 50, the locking member 44 has a forward opening locking chamber 58 (FIG. 3) which is defined by a forward facing planar surface 60 of the dividing wall 50 and a radially inward facing annular chamber surface 62. The locking chamber 58 furthermore is in communication with the keyed aperture 54 which aperture 54 extends through the dividing wall 50 and permits communication between the locking chamber 58 and the plunger cavity 36.

Furthermore, the locking member 44 projects a predetermined distance forwardly beyond the locking chamber 58 and is stepped thereat to define an annular seat 64 which is open on two sides both forwardly and radially inwardly. More specifically, the annular seat 64 is disposed forwardly of the locking chamber 58 and radially outwardly from an edge of the chamber surface 62.

The fishing lure 10 further includes a front housing 70 which extends coaxial with the tail housing 14 as can be seen in FIGS. 1 and 3 to define a hollow housing 71 of the lure 10. The front housing 70 has an exterior wall 72 and an interior wall 74 which are spaced radially apart at a rear end 76 of the front housing 70 and are joined together at a front end 78 thereof. The exterior wall 72 tapers inwardly in a forward direction and is dimensioned at the rear end 76 so as to receive therein the portion of the locking member 44 which extends forwardly from the tail housing 14.

Preferably, the exterior surface 80 of the front housing 70 is flush with the exterior surface 22 of the tail housing 14.

The interior wall 74 includes a radially inwardly facing interior surface 82 which defines a rounded nose-receiving front cavity 84. The interior wall 74 is dimensioned so as to seat within the annular seat 64 of the locking member 44. When seated within the annular seat 64, the nose-receiving cavity 84, the locking chamber 58, the keyed aperture 54 and the plunger cavity 36 are preferably in coaxial registry which define portions of an elongate cavity extending through the hollow housing. Furthermore, the nose-receiving cavity 84 extends forwardly to the front end 78 and opens forwardly therefrom.

The interior surface 82 is stepped intermediate the front and rear ends 76 and 78 so that the nose-receiving cavity 84 is separated by a shoulder 85 into a keyed mounting portion 86 in registry with the plunger cavity 36 and a reduced diameter cylindrical portion 88. The mounting portion 86 preferably has a non-circular "keyed" cross-sectional shape.

The fishing lure 10 further includes a nose assembly 90 (FIGS. 3 and 8) which nose assembly 90 includes a conical nose or nose member 92 that is hollow so as to define an interior cavity 94, and an aperture 96 at a tip end 98 that passes through the conical nose 92. To permit connection of the nose assembly 90 with the front housing 70, the nose assembly 90 has a rearwardly extending engagement portion 100 having a forward mounting end 102. The mounting end 102 is secured within the interior cavity 94 of the conical nose 92 by a suitable adhesive and a threaded eyelet 104 which extends through the nose aperture 96 and is threaded into the mounting end 102. The eyelet 104 is provided for connection to a fishing line (not illustrated).

The engagement portion 100 has a keyed portion 106 (FIG. 8) which corresponds to the keyed shape of the mounting portion 86 of the nose-receiving cavity 84 so as to prevent rotation of the nose assembly 90 after insertion into the nose-receiving cavity 84. In addition, the engagement portion 100 includes a radially outwardly extending step 105 which corresponds to the shoulder 85 of the nose-receiving cavity 84 so as to prevent removal of the nose assembly 90 from the cavity 84. Due to the step 105 which abuts against the shoulder 85, the engagement portion 100 is first inserted forwardly into the nose-receiving cavity 84 prior to mounting of the conical nose 92 thereto.

At the rearward end of the engagement portion 100, resilient fingers or biasing members 108 are cantilevered rearwardly from the mounting end 102. The resilient fingers 108 are able to flex so as to be movable from a locking position illustrated in FIGS. 3 and 4 to a release position illustrated in FIGS. 5 and 6, which release position is able to be attained by forward axial movement of the nose assembly 90. To facilitate locking of the fishing lure 10 in the retracted condition, the resilient fingers 108 include radially inwardly extending bulbous projections 110 at the ends of the fingers 108 which projections 110 are disposed diametrically opposite one with respect to the other. Referring to FIG. 8, the resilient fingers 108 preferably are formed by pairs of spaced apart longitudinal slots 112.

Figure 6:
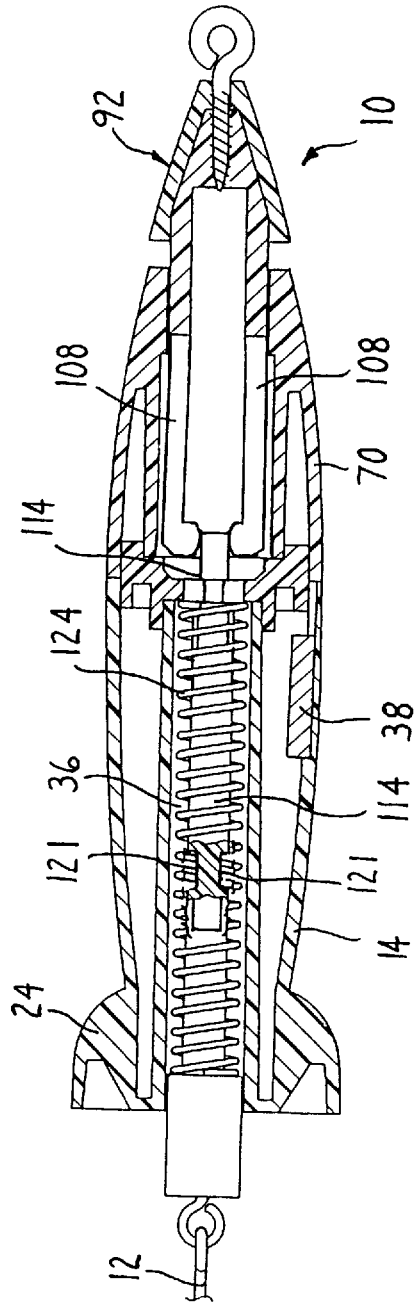
FIG. 6 is a partial side elevational view in cross section illustrating the retractable hook in the fully extended position.

To effect movement of the hook 12 between the retracted position (FIG. 3) and the extended position (FIG. 6), the eyelet 12a of the hook 12 is loosely secured to an elongate plunger 114 as can be seen in FIGS. 3 and 8 and more particularly, to a corresponding eyelet 116 projecting rearwardly from the plunger 114. As can be seen in FIGS. 5 and 8, the plunger 114 is slidably received within the plunger cavity 36 and includes forward flats 118a which are disposed on diametrically opposite sides of the forward tip of the plunger 114 to define a non-circular shape of the forward tip which corresponds to the non-circular shape of the locking member aperture 54. To facilitate insertion of the plunger 114 into the plunger cavity 36, the flats 118a are shaped so as to slide past the aperture flats 56 of the non-circular aperture 54 as can be seen in FIG. 9. After the forward flats 118a have passed through the aperture 54, the plunger 114 is rotated 90° which is permitted by a reduced diameter cylindrical portion 119a of the plunger 114. After rotation, the forward tip of the plunger 114 abuts against the forward facing surface 60 of the locking member 44 so as to prevent return passage of the plunger 114 back through the aperture 54 as illustrated in FIGS. 6 and 10. When the nose assembly 92 is in the extended position as is the case when a fish has been hooked, the bulbous projections 110 are disposed adjacent the forward tip of the plunger 114 (FIG. 6).

Rearwardly of the cylindrical portion 119a the plunger 114 includes diametrically opposite rearward flats 118b which extend rearwardly along a substantial length of the plunger 114 and are oriented 90° relative to the forward flats 118a. The rearward flats 118b similarly define a non-circular shape so as to be freely slidable through the aperture 54, and rearwardly thereof, terminate at diametrically opposite shoulders 120 which are adapted to abut against the dividing wall 50 so as to limit retraction of the plunger 114.

The plunger 114 further includes a rearward reduced diameter cylindrical portion 119b which defines two locking notches or notch regions 121 (FIGS. 5, 7 and 8) disposed on diametrically opposite sides between the forward tip end and rearward hook end of the plunger 114. The notches 121 are oriented 90° relative to the rearward flats 118b so that when the forward flats 118a are oriented as illustrated in FIGS. 3 and 10, the notches 121 are aligned with and lockingly receive the bulbous projections 110 of the resilient fingers 108. Said bulbous projections 110 seat within the notches 121 upon insertion of the plunger 114 through the plunger cavity 36 to the fully inserted position illustrated in FIG. 3.

Once the projections 110 and notches 121 are lockingly mated together, the projections 110 are then restrained in such a position by displacement of the nose assembly 90 and plunger 114 rearwardly into the locking chamber 58 as illustrated in FIG. 3. Once positioned in the locking chamber 58, the chamber surface 62 abuts against the fingers 108 as illustrated in FIG. 7. The notches 121 permit the projections 110 to be displaced out of the notches 121 upon the application of a forwardly pulling tension in the fishing line and displacement of the fingers 108 out of the locking chamber 58.

The plunger 114 also is formed with an increased diameter cylindrical portion 122 which has a diameter proximate the diameter of the plunger cavity 36. To bias the plunger 114 from the retracted position illustrated in FIG. 3 to the extended position illustrated in FIG. 6, a coil spring 124 is slid along the plunger 114 so as to abut against the cylindrical portion 122. More particularly, one end of the coil spring 124 abuts against the cylindrical portion 122 and the other opposite end of the coil spring 124 abuts against the dividing wall 50 of the locking member 44. The coil spring 124 initially is in an expanded condition illustrated in FIG. 6 and thus causes a biasing force when compressed as illustrated in FIG. 3 so as to serve as biasing means.

Referring to FIG. 2, the lure 10 is also provided with an optional removable secondary hook 126. The eyelet 126a of the removable hook 126 is secured to a mounting member 128 which is a collar commonly referred to as a "yoke". The mounting collar 128 comprises a resilient ring 128a which has an eyelet 128b at one end and an arcuate latch 128c at the opposite end to define a normally closed collar mouth 128d. The arcuate latch 128c is adapted to hook about the resilient ring 128a proximate the eyelet 128b. When unlatched, the resilient ring 128a is expanded to open the collar mouth 128d for engagement on the lure 10.

In operation, the fishing lure 10 is assembled by inserting the engagement portion 100 of the nose assembly 90 into the nose-receiving cavity 84 from the rearward end 76. The engagement portion 100 is inserted until the step 105 abuts against the shoulder 85 formed in the nose-receiving cavity 84 while at the same time the keyed portion 106 is aligned with the corresponding keyed shape of the nose-receiving cavity 84 to prevent rotation of the engagement portion 100. Thereafter, the conical nose 92 is mounted on the engagement portion 100 whereby the mounting end 102 thereof is received within the interior cavity 94 of the conical nose 92. The engagement portion 100 and the conical nose 92 are fixedly secured together by a suitable adhesive and threaded engagement of the eyelet 104 through the aperture 96.

Once the nose assembly 90 and the front housing 70 have been secured together, the nose assembly is movable between a forwardly extended position (FIG. 4) and a locking position (FIG. 3).

The plunger 114 is then inserted into the plunger cavity 36 through the rearward end 20 of the tail housing 14. The plunger 114 is progressively inserted therein until the forward flats 178a at the tip of the plunger 114 are inserted through the keyed aperture 58 of the locking member 44 as illustrated in FIG. 9. The plunger 114 is then rotated 90° to the position illustrated in FIG. 10.

Thereafter, the front housing 70 is secured together with the tail housing 14 by placement of the front housing 70 onto the exposed portion of the locking member 44 or vice versa so that the front housing 70, tail housing 14 and locking member 44 are secured together as illustrated in FIG. 3. The aforesaid components are fixedly secured together by suitable adhesives or fasteners (not illustrated). Once assembled, the resilient fingers 108 restrict rotation of the plunger 114 to prevent inadvertent release of the plunger 114 from the plunger cavity 36.

Once assembled, the plunger 114 is advanced forwardly to the fully inserted position illustrated in FIG. 4 whereby the nose assembly 90 is in the extended position. When the nose assembly 90 is in this extended position, the resilient fingers 108 are disposed outside of the locking chamber 58 so as to permit the fingers to flex radially outwardly (FIG. 5) and then move to a locked position upon alignment with the notches 121 (FIG. 4). The nose assembly 90 then is moved rearwardly into the front housing 70 so that the resilient fingers 108 are seated within the locking chamber 58 and prevented from radial outward movement by the radially inward facing chamber surface 62. When the plunger 114 is locked in this retracted position, the hook 12 consequently is at least partially enclosed within the mouth portion 24. More particularly, the barbed tips 12a of the hook 12 are enclosed within the annular chamber 28 so as to prevent snagging of weeds, grass or other underwater obstructions by the hook 12.

Upon the strike of a fish, however, the front housing 70 and the tail housing 14 are pulled rearwardly by the mouth of the fish grasping the fishing lure 10 thereat such that the nose assembly 90 is displaced forwardly relative thereto as illustrated in FIG. 4 to thus cause the resilient fingers 108 to be removed from the locking chamber 58. At the same time, the spring 124 is reaching maximum compression to impede further forward displacement of the plunger 114. As a result, the continued tension on the fishing line causes the nose assembly 90 to continue to be pulled forwardly and thus, pull the bulbous projections 110 out of the notches 121. Upon movement of the projections 110 from the notches 121, the plunger is immediately biased rearwardly by the spring 124 as illustrated in FIG. 5 until the region of the forward flats 118a abuts against the forward facing surface 60 of the locking chamber 58. While further rearward movement of the plunger 114 is prevented, the hook 12 is now in an extended position for embedding within the mouth of the fish being caught thereby. By operating the fishing lure 10 in this manner, the fishing lure 10 remains in a retracted "weedless" condition during casting and retrieving until the fishing lure 10 successfully attracts a fish and prompts a strike thereby, at which time, the fishing lure 10 actuates to an extended condition for catching the fish.

While the fishing lure 10 preferably is used in such a manner, it is also possible to use the lure 10 in the extended condition, which may be desirable in open water or where very few underwater obstructions are present. At which time, it may be desirable to add the optional second treble hook 126 that is secured to the mounting collar 128. The mounting collar includes the collar mouth 128d such that the resilient ring 128a of the mounting collar 128 is spread apart for mounting to the lure 10. The mounting collar 128 preferably is mounted in the gap formed between the nose assembly 90 and the front housing 70 when the nose assembly 90 is in the extended position illustrated in FIG. 6. The arcuate latch 128c is then hooked around the resilient ring 128a proximate the eyelet 128b to prevent dislodgement of the hook 126. This mounting collar 128 is readily removable to facilitate the addition and removal of the optional second hook 126.

Referring to FIGS. 11–16 illustrating the preferred embodiment of the invention, reference numerals in FIGS. 11–16 identifying common components which are substantially the same as those described herein with respect to the embodiment of FIGS. 1–10 include the additional designation of a "-1" added thereto. Referring to FIGS. 11 and 12, the lure 10-1 is substantially the same as that described in FIGS. 1 and 2 in that the lure 10-1 includes a tail housing 14-1, a front housing 70-1 coaxially aligned and connected to the tail housing 14-1 to define a hollow housing, and an axially movable nose assembly 90-1. The lure 10-1 also includes a fin 139 as will be discussed in more detail herein. The fishing lure 10-1 is actuatable between the retracted condition (FIGS. 11 and 15) and the extended condition (FIGS. 12 and 13) whereby the hook 12-1 is released from a mouth portion 24-1 of the tail housing 14-1 for embedding in the mouth of a fish.

More particularly, the tail housing 14-1 (FIG. 13) includes an exterior wall 16-1 which tapers rearwardly inwardly to the mouth portion 24-1. The mouth portion 24-1 includes a rearwardly opening hook-receiving annular chamber 28-1 which accommodates the hook 12-1 when disposed in the retracted position. To further facilitate gripping of the lure 10-1 by the fish for actuating the hook 12-1 to the extended position (FIG. 13), the exterior surface of the mouth portion 24-1 preferably includes a plurality of annular ridges 140 disposed along at least the forward region of the outer surface of the mouth portion 24-1. The ridges 140 provide a rough surface which impedes slippage of the mouth of the fish from the lure 10-1 during a strike.

Figure 15:
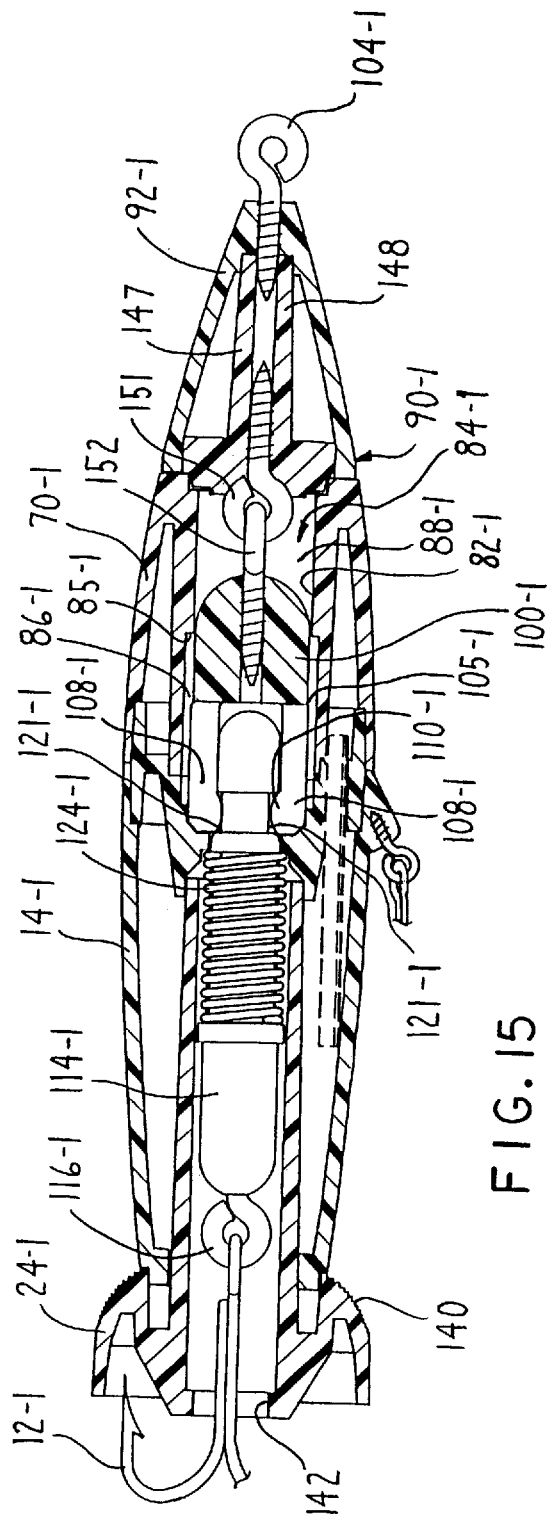
FIG. 15 is a side elevational view in cross section illustrating the fishing lure of FIG. 11.

Referring to FIGS. 13–15, the tail housing 14-1 further includes an interior wall 32-1 which is substantially tubular so as to define the plunger cavity 36-1. Preferably the curved interior surface 34-1 thereof which defines the plunger cavity 36-1 includes an annular plunger retaining rim 142 which projects radially inwardly and is disposed preferably at the rearward open end of the plunger cavity 36-1 so as to define a region having a reduced diameter relative to the diameter of the remainder of the plunger cavity 36-1.

To impede undesirable rotation of the fishing lure 10-1 during retrieval, the exterior wall 16-1 preferably includes the substantially triangular radially outwardly projecting fin 139 which is disposed proximate a forward end of the tail housing 14-1. Preferably, the fin 139 includes a secondary hook 126-1 that is secured to the lure 10-1 by a mounting member 128-1 which is an eyelet embedded in the fin 139. Preferably, the secondary hook 126-1 is a double hook which is slid onto the eyelet 128-1 and serves the additional function of acting as a counterweight.

A cylindrical locking member 44-1 is seated within the forward open end of the tail housing 14-1 and preferably is secured therein by any suitable adhesive or fastener (not illustrated). The locking member 44-1 includes a rearwardly projecting annular wall 48-1 and a dividing wall 50-1 that define a rearward opening seat 52-1. The dividing wall 50-1 includes a circular plunger-receiving aperture 54-1 extending therethrough. The annular wall 48-1 tapers radially inwardly in the region proximate the aperture 54-1 to facilitate coaxial seating of a spring 124-1 which spring 124-1 is substantially identical to the above-described spring 124.

The locking member 44-1 also includes a forward opening locking chamber 58-1 and further includes an annular seat 64-1 for connection to the front housing 70-1. As an alternative to providing the hook 126-1 and the eyelet 128-1, the locking member 44-1 also may include a bore 143 disposed radially outwardly of the annular seat 64-1 which bore 143 tight-fittingly receives an elongate cylindrical counterweight 38-1 (illustrated in phantom outline) which projects rearwardly into the cavity formed between the interior wall 32-1 and the exterior wall 16-1 of the tail housing 14-1.

The front housing 70-1 extends coaxially relative to the tail housing 14-1 and has an exterior wall 72-1 and an interior wall 74-1 which said interior wall 74-1 seats within the annular seat 64-1 of the locking member 44-1. The interior wall 74-1 defines a nose-receiving cavity 84-1 and a nose-receiving annular seat 144. Referring to FIGS. 15 and 16, the interior surface 82-1 is stepped intermediate the front and rear ends thereof so that the nose-receiving cavity 84-1 is separated by a shoulder 85-1 into a keyed mounting portion 86-1 and a reduced diameter cylindrical portion 88-1. Preferably, the mounting portion 86-1 includes substantially flat keyed portions 145 which are disposed diametrically opposite one with respect to the other (one of the keyed portions 145 being illustrated in FIG. 16).

The nose assembly 90-1 (FIG. 13) includes a conical nose 92-1 and an engagement portion 100-1 attached thereto. The open rearward end of the nose 92-1 is enclosed by a nose insert 147 which is centrally seated within the nose 92-1. The nose insert 147 includes a tubular portion 148 which projects into the interior of the nose 92-1 and a circular wall portion 149 which is formed coaxially with the tubular portion 148 and seats within the nose 92-1. The nose insert 147 is connected to the nose 92-1 by an eyelet 104-1 which threadedly engages through the nose 92-1 and into a central bore 150 of the tubular portion 148-1. At the opposite end of the bore 150, an additional eyelet 151 is threadedly engaged therein so as to project rearwardly from the nose insert 147. The wall portion 149 is stepped so as to seat within the nose-receiving annular seat 144 when the lure 10-1 is in the retracted condition.

The eyelet 151 is further connected to an eyelet 152 which is threadedly engaged to the engagement portion 100-1 (FIGS. 13 and 16) which is slidably seated within the nose-receiving cavity 84-1. More particularly, the engagement portion 100-1 is first inserted into the front housing 70-1 from the rearward end thereof. The engagement portion 100-1 has a keyed portion 106-1 which corresponds to the keyed portions 145 of the mounting portion 86-1. A radially outwardly extending step 105-1 on the engagement portion 100-1 corresponds to the shoulder 84-1 to prevent forward removal of the engagement portion 100-1 from the cavity 84-1. The eyelet 152 is threadedly engaged at the forward end of the engagement portion 100 so as to be moved in response to a corresponding axial movement of the nose 90-1. The use of the two connected eyelets 151 and 152 permits limited omni-directional movement of the nose 92-1 relative to the engagement portion 100-1.

The engagement portion 100-1 also includes resilient fingers 108-1 which are cantilevered rearwardly from and are flexible so as to be operable as described herein with respect to the embodiment illustrated in FIGS. 1–10. More particularly, the resilient fingers 108-1 are movable from a locking position (FIG. 15) and a release position (FIG. 14).

To effect movement of the hook 12 between the retracted position (FIG. 15) and the extended position (FIG. 13), an elongate plunger 114-1 is slidably confined within the plunger cavity 36-1. The plunger 114-1 is inserted into the forward end of the plunger cavity 36-1 prior to connection of the locking member 44-1 to the tail housing 14-1. The plunger 114-1 includes a forward rounded tip end 153 which is adapted to be inserted between the resilient fingers 108-1 and also includes an annular reduced diameter locking channel 154 which is adapted to receive the bulbous portions of the resilient fingers 108-1 therein so as to effect locking of the plunger 114-1 in the retracted position illustrated in FIG. 15. While the channel 154 is preferably continuous, the portions thereof in which the projections 110-1 of the fingers 108-1 are received are defined herein as the notch regions or notches 121-1 (FIG. 15). Once positioned in the locking chamber 58-1, the fingers 108-1 are prevented from being displaced outwardly from the notches 121-1 of the channel 154 at least until the application of a forward pulling tension in the fishing line and a resultant displacement of the fingers 108-1 out of the locking chamber 58-1 as illustrated in FIG. 14.

The plunger 114-1 also includes an increased diameter cylindrical portion 122-1 (FIG. 13) having a diameter proximate the diameter of the plunger cavity 36-1. The cylindrical portion 122-1 not only is provided to abut forwardly against the coil spring 124-1 so as to effect biasing of the plunger 114-1 from the retracted position to the extended position, it also serves to prevent passage of the plunger 114-1 past the annular rim 142 and out of the plunger cavity 36-1. Since the cooperation of the increased diameter portion 122-1 and the rim 142-1 prevents removal of the plunger 114-1 from the plunger cavity 36-1, the plunger 114-1 has a shorter longitudinal length than the plunger 114 described herein with respect to FIGS. 1–10.

In operation, the lure 10-1 is operated as described herein with respect to the lure 10. More particularly, the plunger 114-1 is engaged and locked in the retracted position by the fingers 108-1 as illustrated in FIG. 15. In this position, the nose 92-1 is seated in the forward open end of the front housing 70-1. When a fish strikes, the tail housing 14-1 is displaced axially relative to the nose assembly 90-1 such that plunger 114-1 is released (FIG. 14) and is biased to the extended position (FIG. 13). When in this extended position, omni-directional movement of the nose 92-1 is permitted.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A fishing lure for attachment to a fishing line, comprising:

a hollow housing having an elongate cavity extending longitudinally therethrough, said elongate cavity having a mouth portion which opens rearwardly, a nose receiving portion which opens forwardly and a locking portion disposed therebetween;

an elongate plunger slidably disposed within said elongate cavity having a forward end, a rearward end opposite said forward end, at least one locking notch opening radially outwards and located intermediate said forward and rearward ends and a hook member extending rearwardly from said rearward end, said plunger being forwardly slidable along a first path within said elongate cavity to a retracted position where said hook member is disposed within said mouth portion and rearwardly slidable along said first path to an extended position where said hook member projects outwardly from said mouth portion, said locking notch and said hook member being located one with respect to the other such that when said plunger is in said retracted position, said locking notch is disposed proximate said locking portion;

a nose member having an engagement member slidably disposed within said elongate cavity through said nose receiving portion for releasably locking said plunger in said retracted position, said engagement member having means for connection to the fishing line and at least one finger projecting rearwardly within said elongate cavity toward said locking portion, said finger including a radially inward facing projection portion and being resiliently flexible so that said projection portion moves radially inwards into a locking position within said locking notch to restrain said plunger in said retracted position and moves radially outwards into a release position to release said plunger upon forward displacement of said engagement member relative to said plunger; and means for biasing said plunger from said retracted position to said extended position upon said disengagement of said projection portion from said locking notch.

2. The fishing lure according to claim 1, wherein said plunger includes at least two said locking notches in an-oppositely spaced relation and said engagement member includes at least two said fingers in a spaced and opposed relation corresponding to said oppositely spaced relation of said locking notches.

3. The fishing lure according to claim 1, wherein said locking notch is defined by a channel extending about a periphery of said plunger.

4. The fishing lure according to claim 1, wherein said plunger and said engagement member are coaxially aligned within said plunger cavity.

5. The fishing lure according to claim 4, wherein said housing includes a locking member disposed intermediate the opposite ends thereof to define said locking portion of said elongate cavity, said locking member including a guide aperture therethrough in coaxial alignment with said plunger to slidably guide said plunger and a locking chamber disposed forwardly of said guide aperture, said locking chamber opening rearwardly into said guide aperture to receive said plunger, opening forwardly into said nose-receiving portion to receive said finger, and including a radially inward facing peripheral surface which abuts against said finger when said projection portion is engaged within said locking notch to prevent disengagement thereof while disposed within said locking chamber.

6. The fishing lure according to claim 5, wherein said guide aperture has a keyed shape and said plunger has a keyed shape proximate said forward end which corresponds to said keyed shape of said aperture so as to slide through said keyed shape of said guide aperture, said plunger being at least partially rotatable so that said forward end of said plunger abuts against said locking member to prevent removal of said plunger therethrough after insertion through said guide aperture and rotation of said plunger.

7. The fishing lure according to claim 1, wherein said housing includes a locking member disposed intermediate the opposite ends thereof to define said locking portion of said elongate cavity, said rearward end of said plunger including a stepped abutment and said means for biasing being a coil spring disposed about said plunger and having a forward end abutting against said locking member and a rearward end abutting against said stepped abutment, said elongate cavity having an inward projection disposed between said plunger and said mouth portion so as to prevent passage of said plunger rearwardly out of said elongate cavity.

8. The fishing lure according to claim 1, which includes rotation impeding means secured thereto on one side of said housing for impeding rotation of said fishing lure during use.

9. A fishing lure for attachment to a fishing line comprising:

a hollow housing having an elongate cavity extending longitudinally therethrough, said elongate cavity having a mouth portion which opens rearwardly, a nose receiving portion which opens forwardly, and a locking portion disposed therebetween;

an elongate plunger slidably disposed within said elongate cavity having a forward end, a rearward end opposite said forward end, at least one locking notch opening outwardly and located intermediate said forward and rearward ends and a hook member at said rearward end, said plunger being forwardly slidable along a first path within said elongate cavity to a retracted position where said hook member is disposed within said mouth portion and rearwardly slidable along said first path to an extended position where said hook portion projects outwardly from said mouth portion, said locking notch and said hook member being in a spaced relation so that when said plunger is in said retracted position, said locking notch is disposed proximate said locking portion;

a locking member disposed in said locking portion intermediate the opposite ends of said housing, said locking member including a guide aperture therethrough, which is aligned with said plunger to slidably guide said plunger therethrough, and a locking chamber disposed forwardly of said guide aperture, said locking chamber opening rearwardly into said guide aperture to receive said plunger, opening forwardly into said forward portion to receive said finger, and including a radially inward facing peripheral surface;

a nose assembly slidably disposed within said elongate cavity through said nose receiving portion for releasably locking said plunger in said retracted position, said nose assembly having means for connection to the fishing line and at least one finger projecting rearwardly within said plunger cavity toward said locking portion, said finger including an inward facing projection portion and being resiliently flexible so that said projection portion is movable radially inwards into a locking position within said locking notch to restrain said plunger in said retracted position and is movable radially outwards into a release position out of said locking notch to release said plunger upon forward displacement of said nose member relative to said plunger, said finger abutting against said peripheral surface of said locking member when said projection portion is engaged within said locking notch to prevent disengagement thereof while disposed within said locking chamber; and means for biasing said plunger from said retracted position to said extended position upon said disengagement of said projection member from said detent.

10. The fishing lure according to claim 9, wherein said plunger and said nose member are coaxially aligned within said plunger cavity.

11. The fishing lure according to claim 10, wherein said plunger includes at least two said locking notches in a diametrically spaced relation and said nose assembly includes at least two said fingers in a spaced and opposed relation corresponding to said diametrically spaced relation of said detents.

12. The fishing lure according to claim 9, wherein said guide aperture has a keyed shape and said plunger has a keyed shape proximate said forward end which corresponds to said keyed shape of said aperture so as to slide through said keyed shape of said guide aperture, said plunger being at least partially rotatable so that said forward end of said plunger abuts against said locking member to prevent removal of said plunger therethrough after insertion through said guide aperture and rotation of said plunger.

13. The fishing lure according to claim 12, wherein said rearward end of said plunger includes a stepped abutment and said means for biasing is a coil spring disposed about said plunger and having a forward end abutting against said locking member and a rearward end abutting against said stepped abutment, said elongate cavity having an inward projection disposed between said plunger and said mouth portion so as to prevent passage of said plunger rearwardly out of said elongate cavity.

14. The fishing lure according to claim 9, wherein said nose assembly includes a nose portion and an engagement portion pivotally connected to said nose portion so as to be movable relative to said locking member, said engagement portion being disposed in said nose-receiving and having said fingers projecting rearwardly therefrom, said nose portion disposed outside of said housing and having means for connection to a fishing line.

15. A fishing lure for attachment to a fishing line comprising:

a hollow housing having a plunger cavity extending longitudinally and opening outwardly from a rearward end thereof, a mouth portion in communication with said plunger cavity, and a front cavity in a forward end of said housing which is axially aligned and in communication with said plunger cavity;

an elongate plunger slidably disposed within said plunger cavity having a forward plunger end, a rearward plunger end opposite said forward plunger end, at least one first locking part and a hook member secured to said rearward plunger end which extends out of said housing through said mouth portion, said plunger being slidable along a first path within said plunger cavity between a retracted position where said hook member is disposed within said mouth portion and said forward plunger end inserts into said front cavity and an extended position where said hook portion projects outwardly from said mouth portion;

an engagement member slidably disposed within said front cavity for releasably locking said plunger in said retracted position, said engagement member having means for connection to the fishing line and projecting within said plunger receiving cavity toward said plunger, said engagement member including a second locking part and a resilient biasing part that biases said second locking part towards said first locking part so that said second locking part is moveable between a locking position in cooperating engagement with said first locking part to restrain said plunger in said retracted position and a release position disengaged from said first locking part to release said plunger upon displacement of said engagement member relative to said plunger; and means for moving said plunger along said first path so as to move said hook member from said retracted position to said extended position upon said disengagement of said second locking part from said first locking part.

16. The fishing lure according to claim 15, wherein said plunger and said engagement member are coaxially aligned within said plunger cavity, said second locking part being a projection projecting radially inwardly and said first locking part being a notch opening radially outwardly to receive said projection.

17. The fishing lure according to claim 16, wherein said plunger includes at least two said first locking parts in an oppositely spaced relation and said engagement member includes at least two said biasing parts spaced and opposed relation which corresponds to said oppositely spaced relation of said first locking parts.

18. The fishing lure according to claim 15, wherein said biasing part is a resilient finger having said second locking part thereon, and said housing includes a locking member disposed along said plunger cavity to define a locking portion, said locking member including a locking chamber opening rearwardly to receive at least said forward plunger end therein, opening forwardly toward said engagement member to receive said finger therein, and including a peripheral surface facing towards said finger which abuts against said finger when said second locking part is engaged with said first locking part to prevent disengagement thereof while disposed within said locking chamber.

19. The fishing lure according to claim 15, wherein said plunger includes a stepped abutment and said elongate cavity includes a projection disposed proximate said mouth portion in an interfering relation with said stepped abutment to prevent rearward removal of said plunger from said plunger cavity.

20. The fishing lure according to claim 19, which includes a nose member which is disposed forwardly of said housing and is connected to said engagement member through an open forward end of said elongate cavity.

* * * * *